May 29, 1962 C. F. DOERFLER 3,036,599
CONTROL VALVE
Filed March 23, 1959

Carl F. Doerfler
INVENTOR.

BY Olivin D. Olson

Agent

3,036,599
CONTROL VALVE
Carl F. Doerfler, 1165 Hines St., Salem, Oreg.
Filed Mar. 23, 1959, Ser. No. 801,064
1 Claim. (Cl. 137—624)

This invention pertains to fluid pressure valves, and relates particularly to a multiple way fluid pressure valve for use in maintaining a predetermined condition for a fluid pressure controlled device.

There are various industrial operations in which it is desired so maintain a predetermined position or condition of a member or device which is driven by a fluid pressure motor. For example, it is desirable in some instances to mount a bulldozer blade or grader blade for vertical adjustment at its lateral ends, by means of one or more fluid pressure motors, in order to maintain the blade horizontal while grading a level area from sloping terrain. As another example, it is desirable in some instances to be able to vary the operation of a fluid pressure controlled feeding device in order to maintain a predetermined continuous volume or density of feed.

It is a principal object of this invention to provide a fluid pressure control valve which is capable of maintaining within practicable limits a predetermined condition or position of a member or device driven by a reversible fluid pressure motor or motor assembly.

Another important object of this invention is the provision of a fluid pressure control valve which is of simplified construction for economical manufacture, maintenance and repair, and which is precise in its operation.

The foregoing and other objects and advantages of this invention will appear from the following detailed description, taken in connection with the accompanying drawing, in which.

Figure 3:
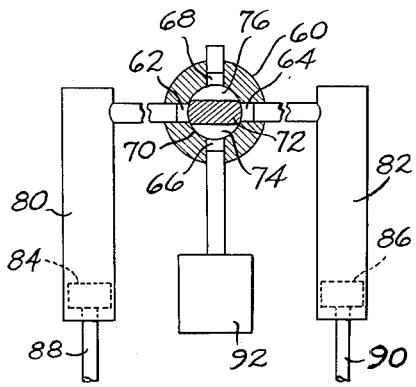
Figure 4:
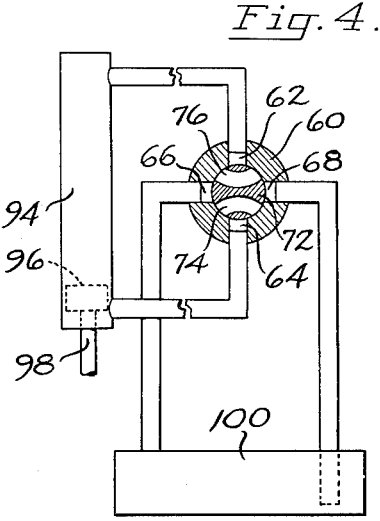

FIG. 3 is a foreshortened schematic view showing a modified form of control valve embodying features of this invention, the valve being illustrated in association with a pair of vacuum operated motors; and FIG. 4 is a foreshortened schematic view showing a further modified form of control valve embodying features of this invention, the valve being illustrated in association with a reversible hydraulic motor.

Figure 2:
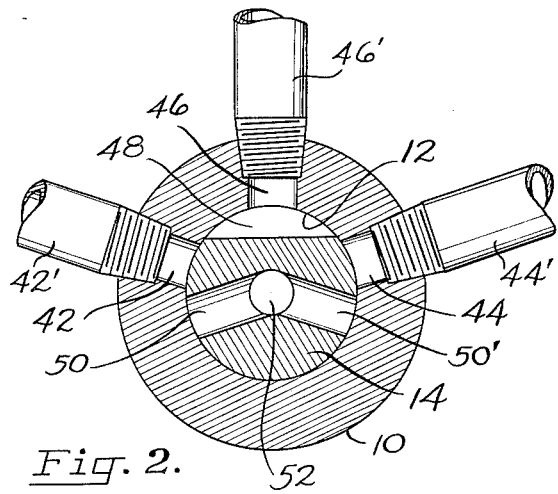
FIG. 2 is a sectional view taken along the line 2—2 in FIG. 1.
Figure 1:
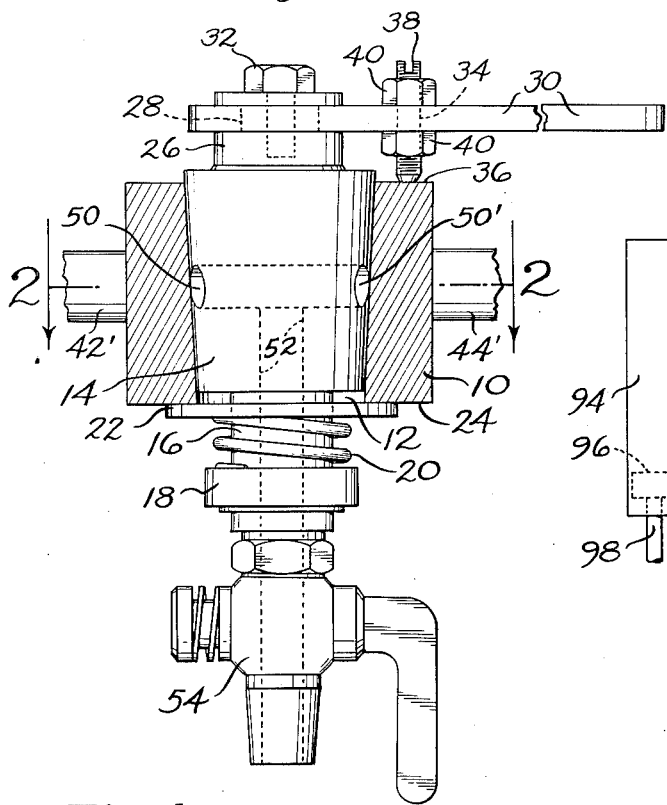
FIG. 1 is a sectional view in side elevation of a control valve embodying the features of this invention.

Referring first to FIGS. 1 and 2, the control valve illustrated therein includes a valve casing 10 provided with a longitudinal bore 12. A valve stem 14 is received within the bore for rotational adjustment. Although the bore and stem may be constructed with a uniform diameter throughout their length, they preferably are tapered in diameter uniformly from one end to the other, as illustrated. A stem extension 16 projects from the end of reduced diameter and is provided adjacent its outer end with a threaded removable collar 18. A compression spring 20 encircles the extension between the collar and a washer 22 which also encircles the extension and abuts freely against the adjacent end 24 of the valve casing. The spring thus urges the stem toward the reduced diameter end of the casing bore.

The end of the stem opposite the extension is provided with a head 26 having a non-circular outer section 28. A control arm 30 is provided with an opening matching the non-circular head section, which is received within it, and the control arm secured to the head by means of the bolt 32.

The control arm also is provided with a threaded opening 34 aligned with the adjacent edge 36 of the valve casing, and receives therein the threaded adjustment screw 38. The adjustment screw functions to abut the adjacent edge of the valve casing and, by adjustment to draw the stem 14 toward the larger diameter end of the casing bore, against the resistance of the compression spring 20. The stem thus is adjusted to closely spaced relation with the casing bore and yet permit maximum freedom of rotational movement for the stem within the bore. A pair of lock nuts 40 are provided on the screw for engaging the opposite sides of the control arm 30 and thus secure the screw in its selected position of adjustment.

In the embodiment illustrated in FIGS. 1 and 2, the casing is provided with a pair of circumferentially spaced fluid pressure outlet openings 42 and 44, threaded for connection of the conduits 42' and 44'. An inlet opening 46 also is provided in the casing, intermediate the outlet openings, and is threaded for connection of the conduit 46'. The inlet and outlet openings communicate with the casing bore 12.

A segment of the valve stem 14 is cut away intermediate the ends of the stem, to provide an inlet port 48. This port is so arranged with respect to the outlet openings that, in the neutral position of the stem illustrated in FIG. 2, the inlet port is sealed from both outlet openings and, by rotating the stem in either direction through an arc of but a very few degrees, for example, from 1 to 5 degrees, the inlet port 48 is caused to effect communication between the inlet opening 46 and one of the outlet openings, and to be sealed from the other outlet opening.

There is also provided in the valve stem of the embodiment illustrated in FIGS. 1 and 2, a pair of radially extending exhaust ports 50, 50' which communicate at their inner ends with a longitudinal exhaust bore 52. This bore extends through the stem extension 16 and may be threaded at its outer end for attachment of a conventional stop cock 54. The outer ends of the exhaust ports 50, 50' are so arranged with respect to the outlet openings 42, 44 that, in the neutral position of the stem illustrated in FIG. 2, the outlet openings are sealed from the exhaust ports and, when the valve stem is rotated in either direction to effect communication between the inlet opening 46 and one of the outlet openings through the inlet port 48, the other outlet opening then is in communication with the exhaust bore 52 through the associated exhaust port. Thus, as fluid pressure is impressed upon one outlet opening from the inlet opening, the other outlet opening is exhausted. The stop cock 54 may be utilized to restrict the exhaust bore so as to dampen the exhaust action, if desired.

It will be understood that reference herein to fluid pressure is intended to include fluid pressures both above and below atmospheric. Thus, it is intended to include partial vacuums as well as elevated pneumatic or hydraulic pressures.

Referring now to the valve construction illustrated in FIG. 3, the casing 60 is provided with a pair of circumferentially spaced outlet openings 62 and 64, an inlet opening 66, and an exhaust opening 68, all of said openings communicating with the longitudinal bore 70 of the casing. Diametrically opposed segments of the valve stem 72 are cut away intermediate the ends of the stem, to provide an inlet port 74 and an exhaust port 76. These ports are so arranged with respect to the openings in the casing that, in the neutral position of the stem illustrated in FIG. 3, the outlet openings are sealed from the inlet and exhaust openings and, upon rotation of the stem in either direction through a very few degrees, for example, from 1 to 5 degrees, the inlet port 74 effects communication between the inlet opening 66 and one of the outlet openings and the exhaust port 76 effects communication between the exhaust opening 68 and the other outlet opening. As in the embodiment illustrated in FIGS. 1 and 2, the exhaust opening may be restricted by an adjustable stop cock, if desired.

FIG. 3 illustrates schematically a vacuum motor assembly which includes a pair of vacuum cylinders 80, 82 each containing a reciprocating piston 84, 86. Piston rods 88 and 90 are connected to the pistons 84 and 86, respectively, and these rods may be connected, for example, to the lateral ends of a bulldozer blade for adjusting the latter to horizontal position. The upper ends of the motor cylinders 80, 82 communicate with the outlet openings 62 and 64 respectively, through conduits, as illustrated, and a source 92 of vacuum is connected to the inlet opening 66 also through a conduit.

In the exemplified use, the vacuum cylinders are mounted pivotally on a bulldozer frame, the valve casing may be mounted on the bulldozer blade, and a gravity suspended weight is connected to the control arm 30 of the valve stem so as to move the latter from the neutral position when the bulldozer blade is displaced from horizontal, whereby to communicate the source 92 of vacuum with the motor cylinder associated with the end of the bulldozer blade which is required to be elevated to restore the horizontal condition. The opposite end of the bulldozer blade is simultaneously lowered by exhausting its associated motor cylinder to the atmosphere.

The valve construction illustrated in FIG. 4, is similar to the embodiment of FIG. 3 with the exception that the inlet port 74 and exhaust port 76 in the stem 72 are formed as holes rather than cut-away segments. By this arrangement all of the openings in the casing are sealed in the neutral position of the stem. In this manner the same degree of sealing may be achieved as in the embodiments of FIGS. 2 and 3, while reducing approximately in half the angle of rotation of the stem required to interconnect the openings in the casing. Further, the arrangement illustrated utilizes the ports 74 and 76 interchangeably as inlet and exhaust ports, depending upon the direction of rotation of the stem.

FIG. 4 illustrates schematically the association of the control valve with a reversible hydraulic motor and a source of hydraulic pressure. Thus, there is illustrated an elongated hydraulic cylinder 94 in which is contained a reciprocating piston 96. A rod 98 attached to the piston may be connected to a movable member whose position affects the movement of another member connected to the valve stem 72. The opposite ends of the cylinder communicate with the outlet openings 62 and 64 in the valve casing through the conduits illustrated. The inlet opening 66 communicates with a source 100 of hydraulic pressure, such as a hydraulic pump, and the exhaust opening 68 returns the hydraulic fluid to the pump.

It will be apparent to those skilled in the art that various changes may be made in the details of construction described hereinbefore. For example, the valve casing and stem may be arranged for relative rectilinear movement, rather than for the relative rotational movement, illustrated. As another example, the exhaust system of the valve may be eliminated if its use is not required. As a further example, the various ports and openings may be used interchangeably for inlet, outlet and exhaust, the only requirement being that the sealing areas of the valve stem cooperating with selected openings have a dimension only slightly greater than the said openings whereby minimum relative movement in either direction from the neutral, sealed position results in communication between the inlet and one or the other of the outlets. These and other changes may be made, as desired, without departing from the spirit of this invention and the scope of the appended claim.

Having now described my invention and the manner in which the same may be used, what I claim as new and desire to secure by Letters Patent is:

A fluid pressure control valve comprising a valve casing member having a tapered bore therein, a tapered valve stem member in the casing member bore, said casing member and said stem member being relatively rotatable, said casing member having a pair of circumferentially spaced fluid pressure outlet openings and an inlet opening therebetween and the stem member having circumferentially spaced inlet and exhaust ports, said inlet and exhaust ports defining between them sealing areas for said outlet openings having a dimension only slightly greater than said outlet openings whereby minimum relative rotation of the members in either direction from a sealed position results in communication between the inlet opening and one of the outlet openings, resilient means interengaging the casing member and stem member and urging the tapers of said members together, and adjustment means slidably interengaging the members for limiting the extent to which the tapers are drawn together.

References Cited in the file of this patent

UNITED STATES PATENTS

| | | |
|---|---|---|
| 673,234 | Boothman et al. | Apr. 30, 1901 |
| 1,425,644 | Greve | Aug. 15, 1922 |
| 1,510,129 | Argy | Sept. 30, 1924 |
| 2,182,459 | Vickers | Dec. 5, 1939 |
| 2,283,397 | Tucker | May 19, 1942 |
| 2,428,069 | Forker | Sept. 30, 1947 |
| 2,538,205 | Leatherman | Jan. 16, 1951 |
| 2,814,309 | Koenig | Nov. 26, 1957 |